United States Patent
Trieb

(10) Patent No.: US 6,640,965 B2
(45) Date of Patent: Nov. 4, 2003

(54) INSTALLATION FOR CONVEYING BULK MATERIALS

(75) Inventor: Herbert Trieb, Wolfurt (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/267,333

(22) Filed: Oct. 9, 2002

(65) Prior Publication Data

US 2003/0155214 A1 Aug. 21, 2003

(30) Foreign Application Priority Data

Feb. 21, 2002 (AT) .......................................... A264/2002

(51) Int. Cl.⁷ .............................................. B65G 21/20
(52) U.S. Cl. ...................................................... 198/839
(58) Field of Search .............................. 198/417, 839, 198/818, 860.1, 861.1

(56) References Cited

U.S. PATENT DOCUMENTS 3,139,970 A * 7/1964 Mordstein .................... 198/839
4,461,378 A * 7/1984 Roth .......................... 198/839 X

FOREIGN PATENT DOCUMENTS

| CA | 565817 | * | 11/1958 | ................. 198/839 |
| GB | 737583 | * | 9/1955 | ................. 198/839 |

* cited by examiner

Primary Examiner—James R. Bidwell
(74) Attorney, Agent, or Firm—Laurence A. Greenberg; Werner H. Stemer; Ralph E. Locher

(57) ABSTRACT

A conveyor belt moves material from a loading station to an unloading station. The belt is formed on its two sides with spaced support rollers that move along a support track. The belt is guided over deflection drums in the loading station and in the unloading station. A turning device turns the conveyor belt through about 180° after the deflection drum in the unloading station, and a turning device turns the conveyor belt back through about 180° in front of the deflection drum of the loading station. Each turning device is formed by a support structure similar to a hollow cylinder with two spiral guides on the inside, along which the support rollers can be moved. The two guides lie approximately diametrically opposite one another and execute an angular rotation of about 180° over the length of the support structure.

8 Claims, 1 Drawing Sheet

INSTALLATION FOR CONVEYING BULK MATERIALS

BACKGROUND OF THE INVENTION

Field of the Invention

The present invention relates to an installation for conveying bulk materials with a conveyor belt, which moves from a loading station to an unloading station, which is constructed on its two sides with a multiplicity of mutually spaced apart support rollers that can be moved along a support track, and which is guided over deflection drums at the loading station and the unloading station. A device, by way of which the conveyor belt is turned through about 180°, is furthermore provided after the deflection drum that is situated at the unloading station, and a device, by way of which the conveyor belt is turned back through about 180°, is provided in front of the deflection drum that is situated at the loading station.

Prior art installations for conveying bulk materials have a conveyor belt that is guided over deflection drums in the regions of the two ends of the installation. However, the prior art installations do not meet the requirements made of them inasmuch as the loading side of the conveyor belt faces downward as the conveyor belt is moved back from the unloading station to the loading station, with the result that conveyed material that has remained on the conveyor belt can fall off the latter. Since this poses a risk to persons, vehicles and equipment underneath the installation and there is, at the very least, the possibility that the area underneath the installation will be contaminated, there is a need to arrange protective devices, e.g. covers, underneath the conveyor belt.

To avoid this disadvantage, it has furthermore been proposed, in the case of installations for conveying bulk materials, to arrange a device that turns the conveyor belt through 180° after the deflection drum situated in the unloading station, ensuring that the conveying side of the conveyor belt strand that is running back to the loading station faces upward, and to arrange a second device, which turns the conveyor belt back through 180°, in front of the deflection drum situated in the loading station. Since the loading side of the conveyor belt strand that is being moved back from the unloading station to the loading station also faces upward in this case, the above-mentioned disadvantages of the other prior art conveying installations are thereby avoided.

SUMMARY OF THE INVENTION

It is accordingly an object of the invention to provide a conveying installation, which overcomes the above-mentioned disadvantages of the heretofore-known devices and methods of this general type and which is constructed with turning devices and meets in an optimum manner the requirements made of such devices as regards the ability to ensure trouble-free operation during the operation of a conveying installation for bulk materials.

With the foregoing and other objects in view there is provided, in accordance with the invention, an installation for conveying bulk materials, comprising:

a conveyor belt extending between a loading station and an unloading station;

a support track extending between the loading station and the unloading station;

a multiplicity of mutually spaced-apart support rollers laterally supported along said conveyor belt and configured to move along said support track track;

a first deflection drum disposed at the loading station and a second deflection drum disposed at the unloading station;

a turning device for turning said conveyor belt through substantially 180° about an axis along a travel direction of said conveyor belt following said second deflection drum in the travel direction;

a turning device for turning back said conveyor belt through substantially 180° in front of said second deflection drum in the travel direction;

each of said turning devices including a support structure substantially of hollow-cylindrical form, and two spiral guides disposed inside said support structure and configured to support thereon said support rollers, said two spiral guides lying substantially diametrically opposite one another and executing a helical turn of about 180° over a length of said support structure.

In other words, the objects of the invention are achieved by virtue of the fact that each turning device is formed by a support structure in the form of a hollow cylinder, arranged on the inside of which are two spiral guides, along which the support rollers arranged to the side of the conveyor belt can be moved, these two guides lying approximately diametrically opposite one another and executing an angular rotation of about 180° over the length of the support structure.

The support structure is preferably formed by a multiplicity of support frames which are formed approximately in a ring shape and are connected rigidly to one another by means of spars extending in the longitudinal direction of the turning device, the support frames being constructed on their inside with two apertures in each case, which are angularly offset in the case of adjacent support frames and in which the guides are held. According to a preferred embodiment, the guides are formed by two pairs of tubes or the like, between which the support rollers can be moved. The guides are preferably constructed with entry slopes at their front ends in a manner known per se. Two rails or the like, which extend in the longitudinal direction of the turning device and along which the support rollers of the strand of the conveyor belt which is moving in the conveying direction can be moved, are furthermore preferably arranged on the upper side of the support frames.

According to a preferred embodiment, the-conveyor belt is constructed with lateral corrugated edges in a manner known per se and is furthermore constructed in a manner known per se with support beams that are aligned transversely to its longitudinal direction and on the two ends of which the support rollers are mounted.

Other features which are considered as characteristic for the invention are set forth in the appended claims.

Although the invention is illustrated and described herein as embodied in an installation for conveying bulk materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
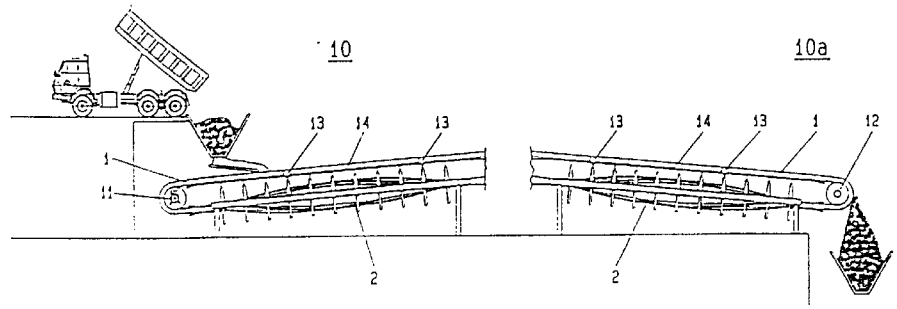
FIG. 1 is a schematic side view of an installation according to the invention.

Referring now to the figures of the drawing in detail and first, particularly, to FIG. 1 thereof, there is shown a conveying installation that has a conveyor belt 1, which is guided around a first deflection drum 11 or pulley 11 at a loading station 10 and is guided over a second deflection drum 12 or pulley 12 in an unloading station 10a. The conveyor belt 1 is constructed with a multiplicity of support rollers 13 arranged in pairs, which are disposed laterally on the outside and roll along rails 14. After the second deflection drum 12 in the direction of motion of the conveyor belt 1 there is a turning device 2, by means of which the strand of the conveyor belt 1 which is being moved back to the loading station 10 is turned through 180°, ensuring that the loading side of the conveyor belt 1 faces upward. This prevents any residues of the conveying material that have remained on the conveyor belt 1 from falling off the conveyor belt 1 during the return motion of the conveyor belt 1 to the loading station 10. In front of the first deflection drum 11 there is another turning device 2, by means of which the conveyor belt 1 is turned back through 180°, thus ensuring that its loading side again faces upward after the first deflection drum 11.

Figure 2:
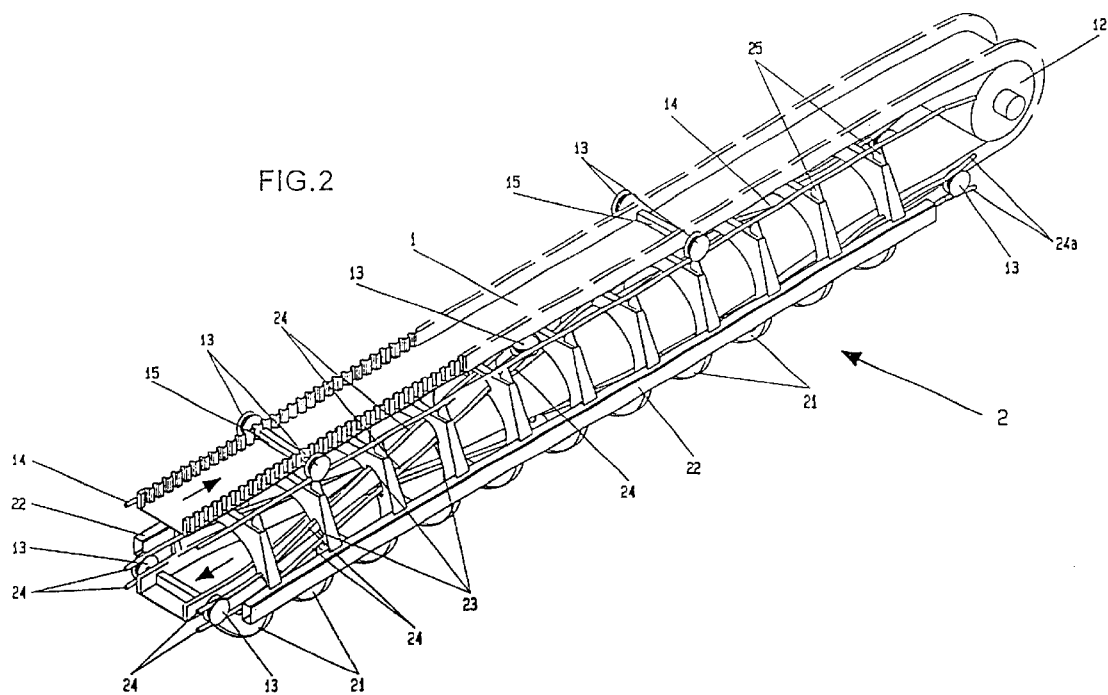
FIG. 2 is a partial perspective view thereof, showing the configuration of turning devices in the installation according to the invention.

With reference to FIG. 2, the turning devices 2 comprise a multiplicity of support frames 21, which are arranged adjacent to one another in the direction of motion of the conveyor belt 1 and are connected rigidly to one another by means of two laterally arranged spars 22. Undercut apertures 23, within which two guides for the support rollers 13 of the conveyor belt 1 are arranged, are provided on the inside of these support frames 21. These guides are formed by two pairs of approximately parallel tubes 24. The apertures 23 are angularly offset relative to one another in the in each case adjacently arranged support frames 21 in such a way that the guides formed by the paired tubes 24 run in a spiral, forming a half turn of a helix from one end of the turning device 2 to its other end. At the end which is at the front in the direction of motion of the conveyor belt 1, the tubes 24 are constructed with entry slopes 24a.

At their upper end, the support frames 21 are provided with supports 25 for the two further tubes 14 or the like arranged above the support frames 21, along which tubes the support rollers 13 of the loaded strand of the conveyor belt 1 are guided. The conveyor belt 1 is, in particular, designed as a corrugated-edge belt. The support rollers 13 are mounted on the two ends of support beams 15, to which the conveyor belt 1 is secured.

The apparatus operates as follows:

The support rollers 13 of the strand of the conveyor belt 1 that is above the turning device 2 run along the two tubes 14. After the conveyor belt 1 has been guided around the deflection drum 12, the support rollers 13 run via the entry slopes 24a into the two guides arranged within the support frames 21 and formed by the pairs 24 of tubes. As the conveyor belt 1 moves on, it is turned by the spiral guides in such a way that the loading side of the conveyor belt 1 faces upward at the end of the turning device 2.

The configuration of the turning device 2 that is arranged in front (as seen in the travel direction of the belt) of the first deflection drum 11 in the loading area 10 is-modified such that the conveyor belt is turned back through 180° by the guides provided in it.

The angular designation of 180° described herein and appearing in the appended claims should be understood as being subject to considerable leeway. The objects of the invention are apparently still achieved when the deflection of the belt is only, say, 170 degrees or only 160 degrees, or even much less.

I claim:

1. An installation for conveying bulk materials, comprising:
    a conveyor belt extending between a loading station and an unloading station;
    a support track extending between the loading station and the unloading station;
    a multiplicity of mutually spaced-apart support rollers laterally supported along said conveyor belt and configured to move along said support track;
    a first deflection drum disposed at the loading station and a second deflection drum disposed at the unloading station;
    a turning device for turning said conveyor belt through substantially 180° about an axis along a travel direction of said conveyor belt following said second deflection drum in the travel direction;
    a turning device for turning back said conveyor belt through substantially 180° in front of said second deflection drum in the travel direction;
    each of said turning devices including a support structure substantially of hollow-cylindrical form, and two spiral guides disposed inside said support structure and configured to support thereon said support rollers, said two spiral guides lying substantially diametrically opposite one another and executing a helical turn of about 180° over a length of said support structure.

2. The installation according to claim 1, wherein said support structure of each said turning device comprises a multiplicity of support frames each formed approximately in a ring shape and a plurality of spars extending in a longitudinal direction of said turning device and rigidly connecting said support frames to one another.

3. The installation according to claim 2, wherein said support frames are formed with two apertures each on an inside thereof for holding said guides, and said apertures are angularly offset between mutually adjacent support frames.

4. The installation according to claim 2, wherein said guides are formed by two pairs of tubes, and said support rollers are movable within respective said pairs of tubes.

5. The installation according to claim 2, wherein said guides are configured as entry slopes at a front end thereof.

6. The installation according to claim 2, wherein two rails extend in the longitudinal direction of said turning device for supporting said support rollers of a strand of said conveyor belt moving in the conveying direction, and said two rails are disposed on an upper side of said support frames.

7. The installation according to claim 1, wherein said conveyor belt is formed with corrugated lateral edges.

8. The installation according to claim 1, wherein said conveyor belt is formed with support beams aligned transversely to a longitudinal direction thereof and said support rollers are mounted on lateral ends of said support beams.

* * * * *